(12) United States Patent
Stuhec et al.

(10) Patent No.: US 8,892,575 B2
(45) Date of Patent: Nov. 18, 2014

(54) DICTIONARY ENTRY NAME GENERATOR

(75) Inventors: Gunther Stuhec, Heidelberg (DE); Dirk Weissmann, Munich (DE)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 13/490,157

(22) Filed: Jun. 6, 2012

(65) Prior Publication Data

US 2013/0332454 A1  Dec. 12, 2013

(51) Int. Cl.
*G06F 7/00* (2006.01)
*G06F 17/30* (2006.01)

(52) U.S. Cl.
CPC ...... *G06F 17/3053* (2013.01); *G06F 17/30684* (2013.01)
USPC .......................................................... 707/750

(58) Field of Classification Search
CPC ................................................. G06F 17/30684
USPC .......................................................... 707/750
See application file for complete search history.

(56) References Cited

U.S. PATENT DOCUMENTS

2003/0233251 A1 * 12/2003 Haskell et al. ................... 705/2

* cited by examiner

*Primary Examiner* — Apu Mofiz
*Assistant Examiner* — Ajith Jacob
(74) *Attorney, Agent, or Firm* — Brake Hughes Bellermann LLP

(57) ABSTRACT

A method for building dictionary entry names for data elements of a canonical data model includes identifying candidate terms for the dictionary entry name of a node or equivalence class of the canonical data model. The method includes counting a frequency of occurrence of candidate terms in use and based on the use counts creating a candidate ordering of terms for the complete ordered dictionary entry name of the node or equivalence class. The method further includes validating the candidate ordering of terms for the complete ordered dictionary entry name of the node or equivalence class by comparison of the ordering with reliable dictionary entry name entries in a database and/or by usage counts in search engine results.

20 Claims, 5 Drawing Sheets

DICTIONARY ENTRY NAME GENERATOR

TECHNICAL WELD

This description relates to structured, semi-structured and unstructured electronic documents.

BACKGROUND

Enterprises (e.g., trade, business, or administrative entities) often use documents or messages sent over electronic networks linking the enterprises' data communications systems for electronic data interchange (EDI).

An EDI data model adopted for a data communications system may dictate a structure of an electronic document or message that can be generated, interchanged, or properly processed by the data communications system. An electronic data interchange (EDI) document generally contains the same information that would normally be found in a paper document used by enterprises for the same purpose. For example, an EDI purchase order document like a paper purchase order document, may include data fields or elements for an 'order header,' an 'order party,' a 'buyer party,' and a 'nameaddress' in sequence. However, the data model merely gives rules for the structure or data format of the electronic documents. Two documents can have the same EDI structure or data format, but may contain different sets of information in the data fields or elements. Further, EDI data models are not unique or universal. Different communication systems that may be deployed for communications between enterprises may be based on different technology platforms, and may have adopted diverse EDI data models. These diverse EDI data models limit interoperability or interchange of documents across interfaces between different types of data communication systems. A document conforming to a data model in one type of data communication system may not be recognized or properly processed in a second, type of data communication system that uses a different data model.

Approaches toward facilitating interoperability or interchange of documents between different types of communication systems involve attempts at standardization, technical mapping and/or translation of documents. In these approaches, the semantics of interface and data models may be considered case-by-case in an ad hoc or piecemeal manner.

Consideration is now being given to developing a canonical data model for integrating electronic data interchange aspects of diverse data communication systems. Attention is directed in particular to integrating data systems processes for electronic data interchange by analysis of semantics and learning.

SUMMARY

In one aspect, a microprocessor-implemented method involves receiving input data on candidate terms for building dictionary entry names (DENs) for a canonical data model (CDM), and processing the input data to identify candidate terms for a DEN of a node or equivalence class of data elements in the CDM. The method further involves counting a frequency of occurrence of candidate terms in the input data, creating a candidate ordering of terms for the complete ordered DEN of the node or equivalence class, and validating the candidate ordering of terms for the complete ordered DEN of the node or equivalence class by comparison of the ordering with reliable DEN entries in a database and/or by usage counts in search engine results.

In another aspect, a system includes a dictionary entry name (DEN) generator hosted on a computer. The DEN generator is configured to identify candidate terms for a DEN of a node or equivalence class of data elements in a canonical data model (CDM). The DEN generator is configured to receive input data on names and definitions of data elements used in EDI data structures, formats and models, and identify candidate terms for the DEN of the node or equivalence class in the CDM by linguistics and semantic analysis of terms in the input data. The DEN generator is further configured to revise or validate an ordering of the candidate terms for the DEN of the node or equivalence class by comparing the ordering with known DENs of data elements.

In yet another aspect, a computer program product embodied in non-transitory computer-readable media includes executable code, which when executed identifies candidate terms for a dictionary entry name (DEN) of a node or equivalence class of data elements in a canonical data model, counts a frequency of occurrence of candidate terms in a data store, creates a candidate ordering of terms for the complete ordered DEN of the node or equivalence class, and validates the candidate ordering of terms for the complete ordered DEN by comparison of the ordering with reliable known DEN entries in a database and/or by usage counts in search engine results.

BRIEF DESCRIPTION OF THE DRAWINGS

Like reference symbols in the various drawings indicate like elements.

The details of one or more implementations are set forth in the accompanying drawings and the description below. Other features will be apparent from the description and drawings, and from the claims.

DETAILED DESCRIPTION

For convenience in description herein, computer systems and various computer applications that are used for electronic data interchange may be individually or collectively referred to as "data systems" herein. Further, it will be understood that the terms data structures, data formats and data models may be used interchangeably herein, and further references to "type system" will be understood as referring to a data model type adopted by the system.

Diverse types of data systems are in use for electronic data interchange (EDI) amongst a multitude of enterprises (e.g., banks, government, brokers, customers, retailers, distributors, etc). The data systems may adopt different data models for structuring and formatting electronic documents and messages. The different types of data systems and data models that are deployed have created a need for standardization, technical mapping and/or translation of data elements in EDI documents.

In accordance with the principles of the disclosure herein, solutions are provided to facilitate interchange of electronic documents and messages having different data formats amongst diverse data systems. The solutions may utilize a canonical data model (CDM) to provide consistent, semantically correct, unambiguous and formal representation of element names in data structures of the electronic documents and messages.

Various standards organizations have set forth standards for data structures and formats of EDI documents and messages. The standards may target different domains or contexts of activity. For example, the TRADACOMS standard is predominant in the UK retail industry, and the ODETTE standard is predominant within the European automotive industry. An EDI standard may prescribe a data model (i.e. formats, character sets, and data elements) to be used in the exchange of business documents and forms. An EDI standard may indicate which components or elements of information are mandatory for a particular document, which components or elements are optional, and give rules for the structure of the document. For example, UN/CEFACT Core Component Technical Specification (CCTS) (UN/CEFACT, 2009) attempts to standardize document structures or schemas by prescribing a common set of core components or elements in a document. The names of the core components or elements in CCTS may be referred to Dictionary Entry names (DENs). A DEN itself may have an ordered structure (e.g., DEN: [OCQs_] OCT. [PQs_]PT. RT, where the abbreviations OCQ, OCT, PQ, PT and RT stand for "Object Class Qualifier," "Object Class Term," "Property Qualifier," "Property Term" and "Representation Term," respectively). An example DEN (with OCQ1=physical; OCT=address; PT=street; and RT=name) may be Physical_Address. Street. Name.

Figure 2:
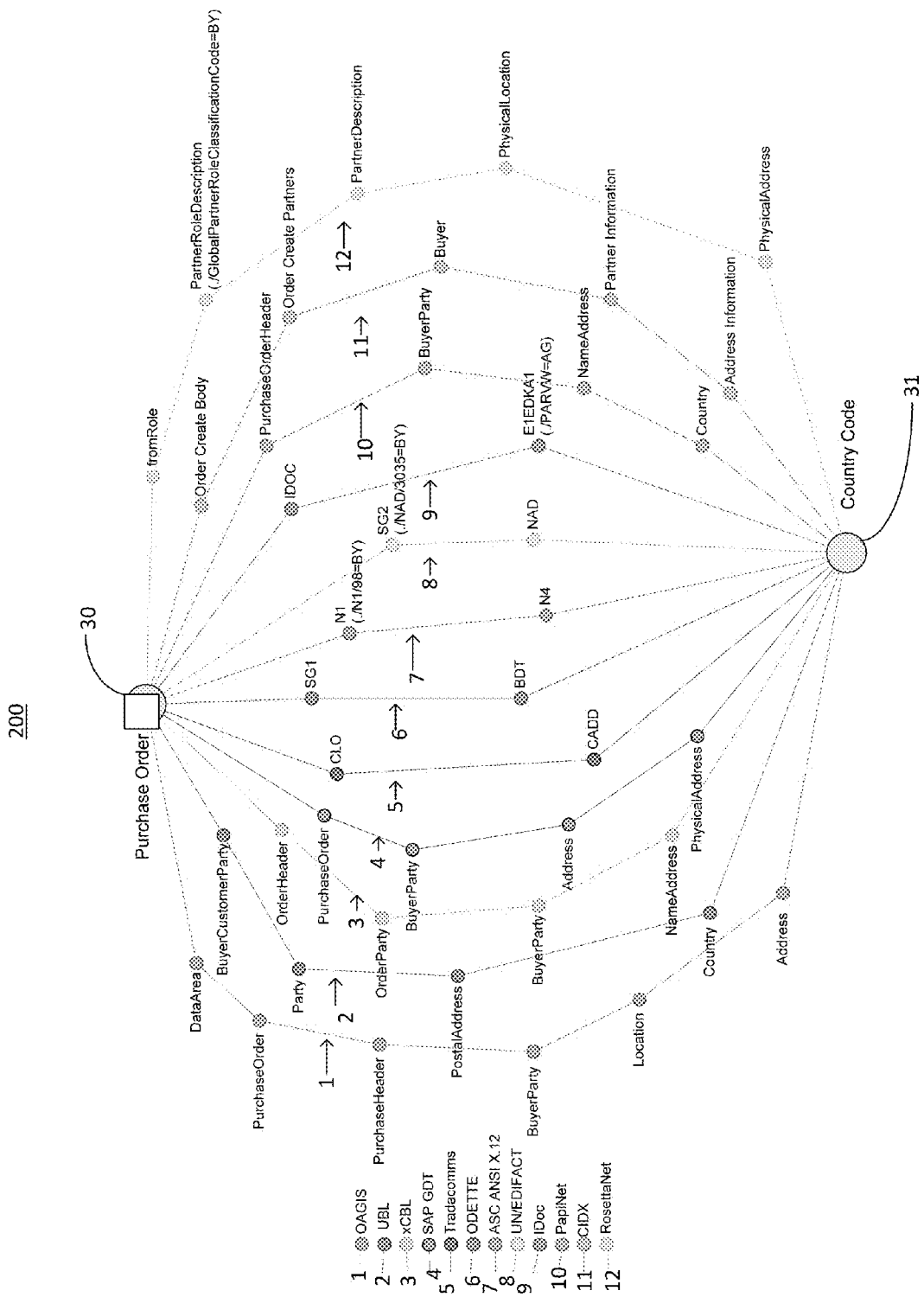
FIG. 2 is a graphical illustration of data structures or schemas for a purchase order under various EDI data models.

The CCTS provides rules for how the names of the core components or elements can be assembled. However, in practice, application of the CCTS may yield unavoidably different representations of core component semantics because the name assembly rules can be applied differently and different words can be used for same meaning. Thus, application of CCTS can yield a heterogeneous representation of data element names in purportedly standardized EDI documents. Further, structures for a document under other EDI standards, which may not conform to the CCTS, may have other representations of data element names. For example, in Open Applications Group Integration Specification (OAGIS) data model, a purchase order document has the following data elements: GetPurchaseOrder, DataArea, PurchaseOrder, Purchase OrderHeader, BuyerParty, Location, Address, and CountryCode. In Universal Business Language (UBL) data model, a purchase order document has the following data elements: Order, BuyerCustomer, Party, Party PostalAdress, and Country IdentificationCode. FIG. 2 shows schemas 1-12 in graph form starting from a root node 30 ("Purchase Order") to a leaf node 32 ("Country Code") for a purchase order document in twelve example EDI data models (e.g., OAGIS, UBL, xCBL, SAP GDT, Tradacomms, ODETTE, ASC ANSI X.12, UN/EDIFACT, IDoc, PapiNet, CIDX and Rossettanet).

Figure 1:
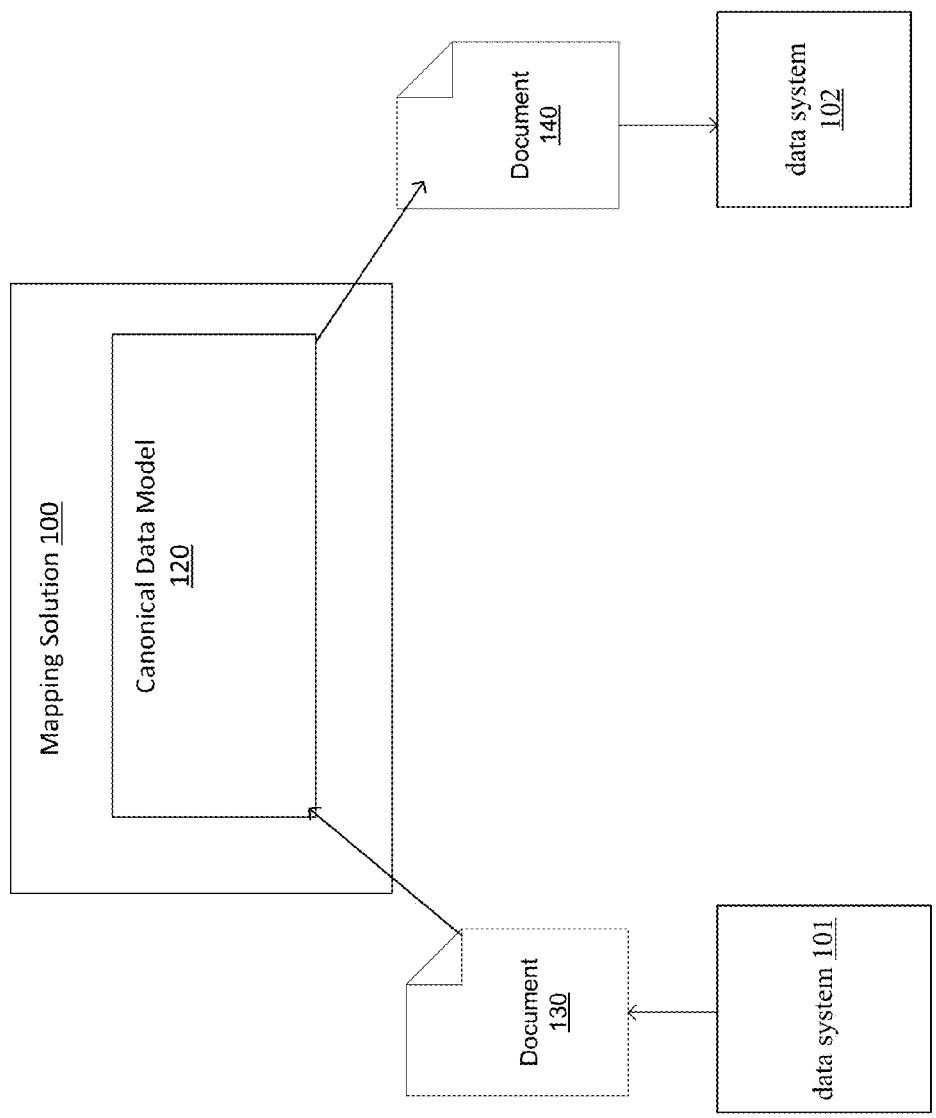
FIG. 1 is a block diagram illustrating deployment of a data format mapping solution for electronic data interchange documents and messages, in accordance with the principles of the disclosure herein.

FIG. 1 shows an example microprocessor-implemented mapping solution 100, which may facilitate electronic data interchange of documents and messages having different data structures or formats amongst diverse data systems, in accordance with the principles of the solutions describe herein. Solution 100 may be based on a canonical data model (CDM) 120. CDM 120 may define document or message formats that are independent of details of any specific application (e.g., data systems 101, 102) so that all applications can communicate with each other without any loss of information due to differences in data model use. CDM 120 may represent an intermediary data format for a document or message (e.g., document 130) without regard to either individual data model use or hardware of the document or message-generating data system (e.g., data system 101). Deployment of CDM 120 may require mapping of the formats adopted by a data system (e.g., data system 101) generating a document (e.g., document 130) to the CDM's intermediary data format only once. The CDM's intermediary data format may allow creation of a mapped document (e.g., mapped document 140) that can be properly processed by diverse data systems (e.g., data systems 102, etc.).

CDM 120 defines formats or data structures for documents or messages. A CDM-defined data structure may include one or more named data elements. CDM 120 may provide consistent, semantically correct, unambiguous and formal representations of the data element names. The data element names in CDM may, like the names in CCTS, be referred to herein as dictionary entry names (e.g., DENs).

Figure 4:
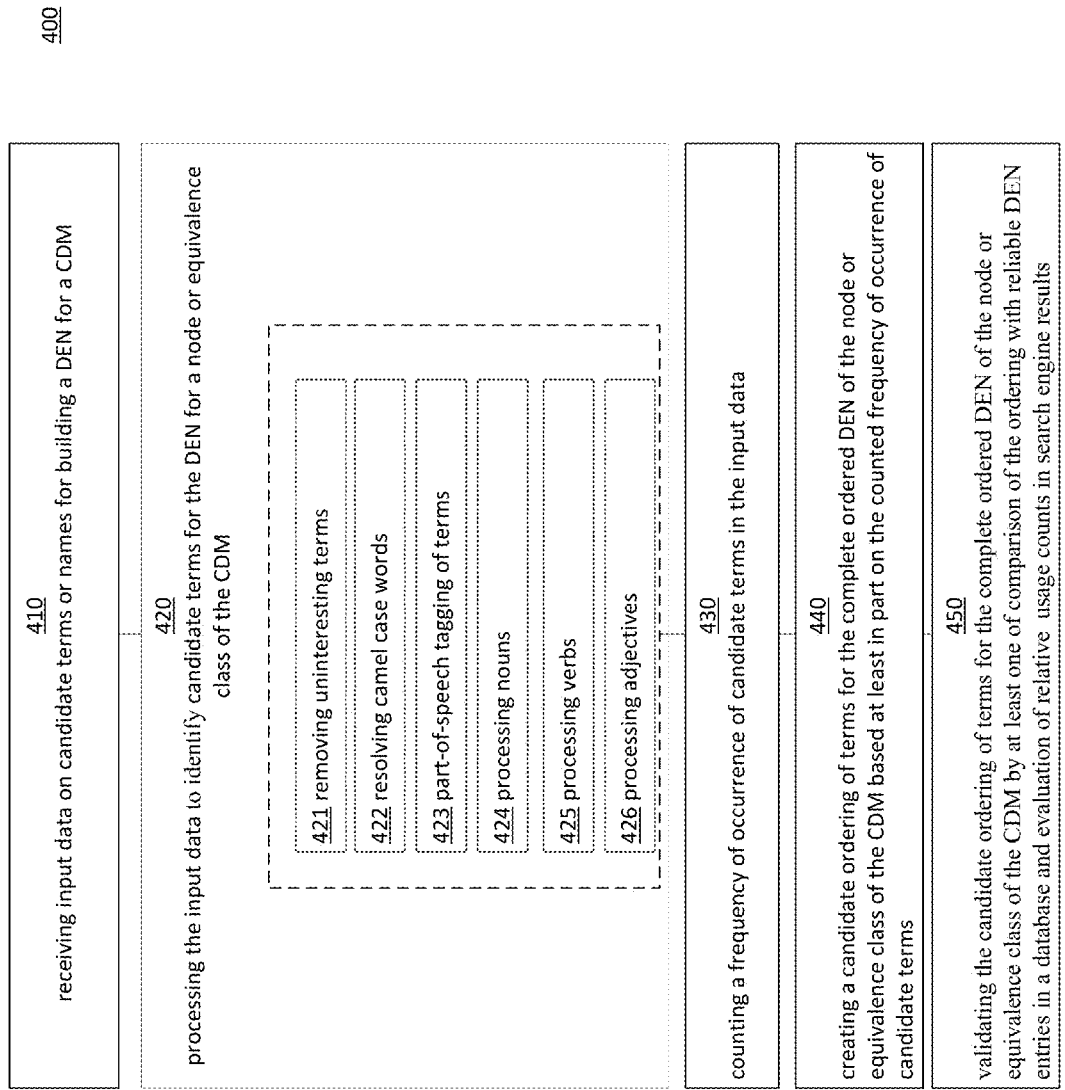
FIG. 4 is a flow chart illustrating an example method for generating dictionary entry names for a canonical data model, in accordance with the principles of the disclosure herein.

FIG. 4 shows an example method 400 for generating DENs for CDM 120. Method 200 may utilize pre-processed information on data elements of various data structures (schemas), formats and models that are used, for example, in current. EDI practice. The pre-processed information may be derived from an analysis of definitions and names of semantically proximate data elements in the different data structures, formats or models. Further, the pre-processed information may include possible mappings, groupings or aggregations of the data elements in to one or more "equivalence classes." Each, equivalence class may include data elements that, possibly may be semantic matches (i.e. have the same meaning) of each other. The pre-processed information may further include natural language definitions of the data elements in the various data structures, formats or models, and may also include corresponding data element names and definitions if available in CCTS. The pre-processed information may also include domain-specific or context-specific representations of the data elements. The pre-processed information may also include identification of "noise" representations that may be filtered out and which need be not considered in building CDM 120.

Table I shows an example sample of pre-processed information, which may be utilized by method 400 for generating DENs for CDM 120. In particular, Table I shows an example "Equivalent Class 2; "Purchase Order. Buyer. Party"" for the data element name "Buyer. Party," which may have been established for schemas 1-12 (shown in FIG. 2) for a purchase order document. Under the headings "Type System" and "Name", Table I lists the twelve example EDI data models (e.g., OAGIS, UBL, xCBL, SAP GDT, Tradacomms, ODETTE, ASC ANSI X.12, UN/EDIFACT, IDoc, PapiNet, CIDX and Rossettanet) and the names of the data elements in the twelve data models. Table I also lists, under the heading "Definition," the natural language definitions of the data elements in the Equivalence Class "Buyer. Party" that may be available for the twelve example data models. Further, TABLE I may also include CCTS names and definitions for the data element Buyer. Party if available. TABLE I as shown for example, under the heading "CCTS name", includes an entry for a CCTS name "Order. Buyer_Customer Party. Customer Party" in the second row (for die UBL type system). Further, TABLE I as shown for example, under the heading "CCTS", includes entry X as a CCTS definition for the data elements BuyerParty and BuyerCustomerParty in the first, second and third rows (for the OAGIS, UBL, and SAP GDT type systems, respectively).

TABLE I

Equivalent Class 2: "Purchase Order. Buyer. Party":

| Type System | Name | Definition | CCTS | CCTS Name |
|---|---|---|---|---|
| OAGIS | BuyerParty | The entity that was responsible for Buying the document or element in which it is associated. Additionally, the contact may be a person or a group or department. | X | |
| UBL | BuyerCustomerParty | An association to the Buyer. | X | Order. Buyer_ Customer Party. Customer Party |
| xCBL | BuyerParty | Contains the information for the party purchasing the goods. | | |
| SAP GDT | BuyerParty | A BuyerParty is a party that buys good or services. | X | |
| Tradacomms | CLO - Customer's Location | Customer's location | | |
| ODETTE | BDT - Buyer Details | A mandatory, repeatable segmemt which gives details to the buyer. A coded or uncoded name and address must be included. | | |
| ASC ANSI X.12 | N1 - Segment group (./N1/98=BY - Buyer) | ./N1 - "To identify a party by type of organization, name, and code ./N1/98 - "Code identifying an organizational entity, a physical location, property or an individual" ./N1/98=BY "Buying Party (Purchaser)" | | |
| UN/EDIFACT | SG2 - Segment Group (./NAD/3035=BY - Buyer) | A group of segments identifying the parties with associated information. ./NAD - "A segment identifying names and addresses of the parties, in coded or clear form, and their fuctions relevant to the order. Indentification of the seller and buyer parties is mandatory for the order message. It is receommended that where possible only the coded form of the party ID should be specified e.g. The Buyer and Seller are known to each other, thus only the coded ID is required, but the Cosignee or Delivery address may vary and would have to be clearly specified, preferably in structured format." ./NAD/3035 - "Code giving specific meaning to a party." ./NAD/3035=BY - "Party to which merchandise or services are sold." | | |
| IDoc | E1EDKA1 - Partner information (./PARVW=BY - Buyer) | The segment includes the address of the business partner. The individual roles of the business partners and their addresses are qualified in field "PARVW". ./PARVW - "Partner function (e.g. sold-to party, ship-to party, . . . )" ./PARVW=BY - "Sold-to party" | | |
| PapiNet | BuyerParty | The legal entity to which the product is sold. Also commonly referred to as the sold to party or customer. If no OtherParty is defined as the Payer, the Buyer is the Payer. | | |
| CIDX | Buyer | Purchasing party or role in a trasaction. If the purchasing party is not the owning party then the owning party will be the "SoldTo" partner. | | |
| RosettaNet | PartnerRoleDescription (./GlobalPartnerRole ClassificationCode= Buyer) | The collection of business properties that describe a business partners' role in a partner interface process. ./GlobalPartnerRoleClassificationCode - "Code identifying a party's role in the supply chain." ./GlobalPartnerRoleClassificationCode=Buyer - "An employee or organization that buys products for a partner type in the supply chain." | | |

Figure 3:
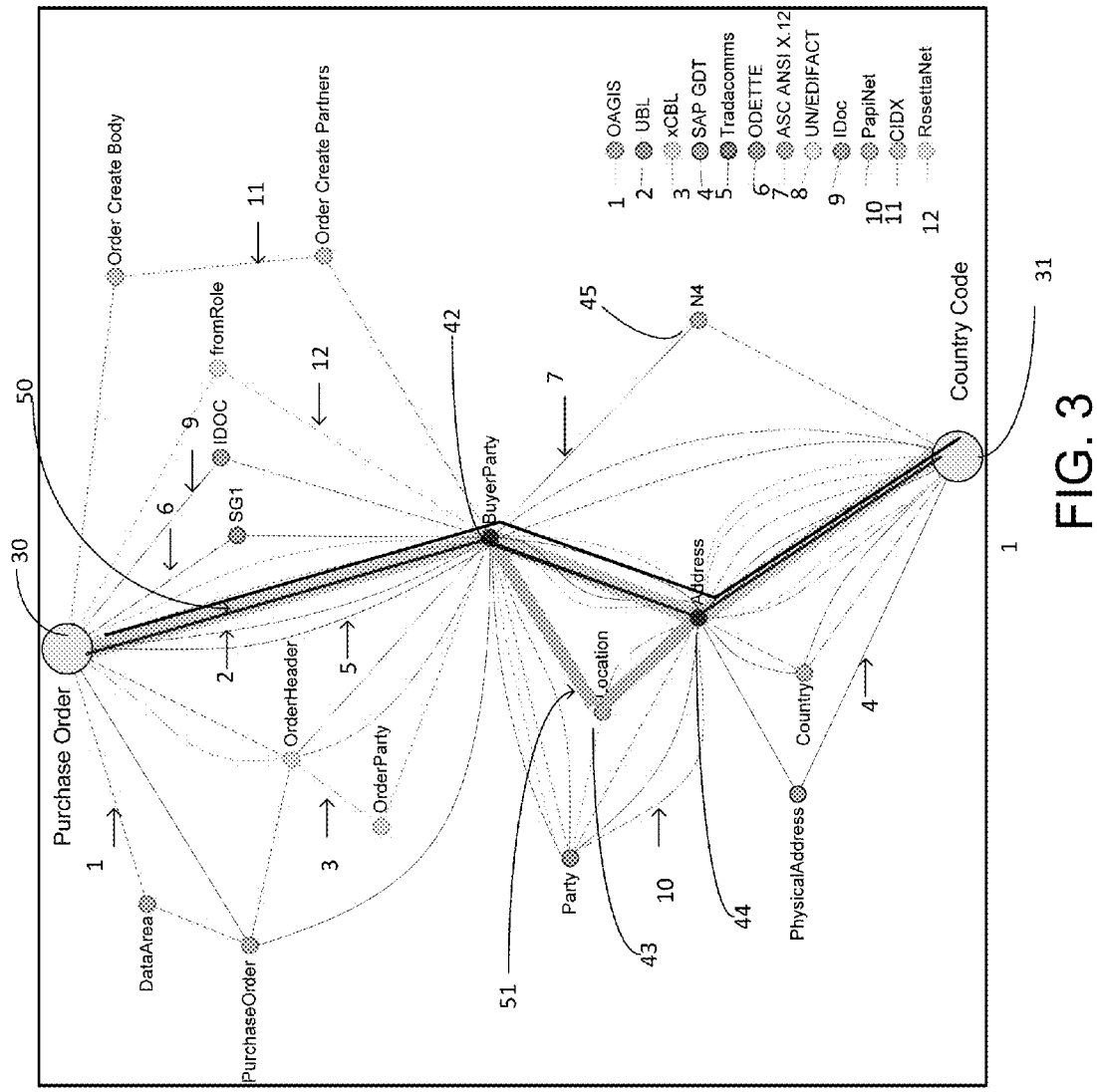
FIG. 3 is a graphical illustration of how data elements of the different data model schemas of FIG. 2, which are semantically the same or similar, may be consolidated by identification of equivalence classes, in accordance with the principles of the disclosure herein.

For a given document type (e.g., a purchase order), the pre-processed information may include a likely CDM (hereinafter "a prototype semantic model"). The prototype semantic model may, for example, be a semantically most-likely or most-common graph of data elements with nodes of the graph corresponding to the one or more equivalence classes. FIG. 3 shows an example prototype semantic model 300 displayed in graph form. The graph demonstrates how data elements of different data model schemas 1-12 (shown in FIG. 2) that are semantically the same or similar may be consolidated by identification of equivalence classes (e.g., BuyerParty 42, Location 43 and Address 44). Some of the equivalence classes (e.g., BuyerParty 42 and Address 44) may have elements from almost every type system (e.g., schemas 1-12). These equivalence classes are shown as nodes 42, 43 and 44 between root node 31 "Purchase Order" and leaf node 32 "Country Code" in the graph. This graph may be used as a prototype for the likely CDM. FIG. 3 also shows, for example, most likely paths 50 and 51 from root node 31 to leaf node 32 passing through nodes (42, 44) and (42, 43, 44), respectively. All other data elements (e.g., data element 45) which are not on the most likely paths 50 or 51 may be considered to be noise representations that, at least preliminarily, may not be considered in building DENs for CDM 120.

With renewed reference to FIG. 4, method 400 for generating DENs for CDM 120 includes receiving input data or information on candidate terms or names for building a DEN for CDM 120 (410), processing the input data to identify candidate terms for the DEN for a node or equivalence class of CDM 120 (420), counting a frequency of incidence or occurrence of candidate terms in the input data (430), creating a candidate ordering of terms for the complete ordered DEN for the node or equivalence class of CDM 120 based at least in part on the counted frequency of occurrence of candidate terms (440), and validating the candidate ordering of terms for the complete ordered DEN for the node or equivalence class of CDM 120 by validating the candidate ordering of terms for the complete ordered DEN of the node or equivalence class of the CDM by at least one of comparison of the ordering with reliable DEN entries in a database and evaluation of relative usage counts in search engine results (450).

In method 400, receiving input data on candidate terms or names (410) may include receiving natural language definitions of data elements and names of one or more nodes (equivalence classes) of a prototype semantic model. The names of the nodes of the semantic model may, for example, be XML tags (e.g., CreditCardProvider, BuyerParty, etc.). The input data may also include alternative definitions of the nodes of the prototype semantic model if available, and further include CCTS DENs of the nodes of the prototype semantic model if available.

Further in method 400, in preparation for counting a frequency of incidence or occurrence of candidate terms in the input data 430, processing the input data 420 may include identifying candidate terms for a DEN of a node or equivalence class by removing uninteresting terms (421), resolving camel case words (422), part-of-speech tagging of terms (423), processing nouns (424), processing verbs (425), and processing adjectives (426).

Removing uninteresting terms 421 may include removing unusable characters and words (e.g., braces, apostrophes, etc.) and removing words and character sequences (other than blanks and punctuations) that are less than a minimum length (e.g., a three character length). Further, removing uninteresting terms 421 may include removing terms that may be provided (e.g., in examples in the natural language definition of a data element) but do not fit a general accepted semantic meaning of the data element.

Resolving camel case words 422 may involve introducing delimiters (e.g., blanks) to separate a camel case word into its constituent words. Further, part-of-speech tagging of terms 423 may involve classifying single terms as nouns, verbs (excluding auxiliaries) or adjectives. Part-of-speech-tagging 213 may ignore nominal phrases that do not contribute to identification of a relevant, term for a DEN.

In method 400, processing nouns 424 may include application of linguistics analysis tools to identify candidate terms for the DEN. Processing nouns 424 may, for example, include lemmatization, consolidation of related terms, spell checking and automatic correction of spell, errors, resolving abbreviations, and interpretation or determination of compound nouns. Several of these linguistics analysis tools may be applied using, for example, online resources. For example, lemmatization of nouns may be performed with reference to an online lexicon (e.g., WordNet), Spell checking may be performed using, for example, Java Open Source Spell Checker (Jazzy). Resolving abbreviations may utilize online public sources (e.g., online database "Acronym Finder"). Consolidation of related terms may include a stemming step, checks on substrings, and consulting an online thesaurus (e.g., WordNet) for consolidating synonyms.

Processing verbs 425 and processing adjectives 426 may include linguistic nominalization which, turns a verb or an adjective into a noun. Processing verbs 425 may include processing nominalized verbs as nouns. Processing adjectives 426 may include processing an adjective that is orthographically common or similar to a verb differently than an adjective that is orthographically dissimilar to a verb. An adjective that is orthographically similar to a verb may be nominalized and processed as a noun. An adjective that is not orthographically similar to a verb may be treated as DEN term and preferred, as a qualifier (e.g., as an Object Class Qualifier or a Property Qualifier).

In method 400, after the input data is processed and candidate terms (nouns verbs, and adjectives) for a node or equivalence class are identified, counting a frequency of incidence or occurrence of candidate terms 430 may involve counting occurrences of the candidate terms in the processed input data. Counting a frequency of incidence or occurrence of candidate terms 430 may further include weighing the frequencies of incidence or occurrence of candidate terms by assigning relative weights to occurrences of candidate terms in different regions or portions of the input data. For example, occurrences in definitions, names and DENs portions of the input data may be assigned relative weights 0.5, 1 and 2, respectively. Counting a frequency of incidence or occurrence of candidate terms 430 may further include assigning a list of candidate terms toward building the DEN. Terms in the list may be ranked by counts (or weighted counts) of incidence or occurrence.

Tables IIA and IIB show an example equivalence class "Address" for a purchase order document, and an example list of candidate terms toward building a DEN "Party. Delivery. Physical Address," respectively. Tables IIA lists for example the natural language definitions of data elements in the Equivalence Class "Address" that may be available for several example EDI data models (e.g., OAGIS, UBL, xCBL, ASC ANSI X.12, UN/EDIFACT, CIDX and Rossettanet), and further may also list CCTS names for the data elements if available. Table IIB shows for example several candidate terms that are sorted by counts (or weighted counts) of incidence or occurrence.

TABLE IIA

| Type System | Name | Definition | CCTS_DEN |
|---|---|---|---|
| EDIFACT | NAD (Name and address) [1..1] (./3035 (Party function code qualifier) = "ST (Ship To)") | A segment identifying names and addresses of the parties, in coded or clear form, and their functions relevant to the order Identification of the seller and buyer parties is mandatory for the order message. It is recommended that where possible only the coded form of the | |

TABLE IIA-continued

| Type System | Name | Definition | CCTS_DEN |
|---|---|---|---|
| | | party ID should be specified e.g. The Buyer and Seller are known each other, thus only the coded ID is required, but the Cosignee or Delivery address may vary and would have to be clearly specified, preferably in structured format. | |
| ASC X12 | N3 (Party Location) | | |
| OAGIS | Address | Address BaseType provides the information about the address or semantic address of an associated entity. | |
| UBL | cac: DeliveryAddress [0..1] | An association to Delivery Address. | Delivery. Delivery_ Address. Address |
| CIDX | AddressInformation | Documentation: Description: Structure which holds complete address information | |
| RosettaNet | 443 PhysicalAddress | The actual physical location of an entity as prescribed by local postal authorities, including country identification as it relates to the party or a product. | |
| xCBL | NameAddress [0..1] | contains the name and address information for the entity being described by the Party element. | |

TABLE IIB

| Frequency | Word |
|---|---|
| 26 | physical address |
| 9 | Party |
| 9 | delivery |
| 6 | Name |
| 4 | Code |
| 3 | location |
| 3 | identification |
| 3 | function |
| 3 | Entity |
| 2 | ship |
| 2 | qualifier |
| 2 | order |
| 2 | nod |
| 2 | form |
| 2 | description |
| 1 | type |
| 1 | structure |
| 1 | specification |
| 1 | semantic |

In method 400, creating a candidate ordering of terms for the complete ordered DEN of the node or equivalence class of the CDM 440 may include creating an ordering with one or more terms having the highest counts or frequencies of occurrence. For example, the frequency count results shown in Table IIB may provide four relevant terms (e.g., "Party," "Address," "Delivery," and "Physical"), which have relatively high counts or frequencies of occurrence (e.g., 26, 26, 9 and 9, respectively), toward a candidate ordering of terms for building the DEN: Party. Delivery. Physical Address.

Creating a candidate ordering of the one or more terms having the highest count may include, for equivalence class nodes under a root node in the prototype semantic model, inheriting a first term (DEN-Object Class Term) from the root node. For an equivalence class node that is a leaf node, creating a candidate ordering may include determining a last term (DEN-Representation Term) of the ordering by comparing the candidate terms with a list of possible representation terms in leaf elements of the prototype semantic model. Further, creating a candidate ordering may include determining a remainder of the ordering by making permutations of the candidate terms and selecting a permutated ordering that has the highest counts or frequencies of occurrence in a persistence database or other knowledge databases containing reliable DEN entries. Method 400 may compare terms in the candidate ordering with stored terms in the knowledge databases by using a permutation matrix. If the result of the comparison is nil method 400 may further include revising the permutated ordering of terms by iteratively dropping candidate terms one by one to reduce the number of terms in the ordering. Method 400 may include comparing a revised permutated ordering of terms with the stored DEN terms in the persistence database or other knowledge databases containing reliable DEN entries. This iterative comparison procedure may use a matching algorithm for similarity checks between the permutated ordering of terms and the stored DEN terms. The matching algorithm may provide a DEN similarity score, which may be used to guide further revisions of the permutated ordering of terms. The iterative comparison procedure may yield the complete ordered DEN or at least a part of the ordering of terms for the complete ordered DEN.

Method 400 may include identifying undetermined or unknown terms and their positions in the complete ordered DEN at any stage, and limiting further analysis or processing to only resolving the undetermined or unknown terms and their positions in the candidate orderings of terms.

Creating a candidate ordering of terms for a complete ordered DEN 440 may, additionally or alternatively, include comparing terms in the permutated ordering of terms with terms and words in an online lexicon or thesaurus (e.g., WordNet). Creating a candidate ordering of terms for a completed DEN 440 may also, additionally or alternatively, include determining a frequency of use of the permutated ordering of terms by considering results of searches of public data sources (e.g., Internet sources). Method 400 may include using Internet search engines (e.g., Google, Yahoo, etc.) for the searches of public data sources. Method 400 may include selecting the permutated ordering of terms with the highest hit counts in search engine results toward building the DEN. In case the search engine results contain no or negligible hit counts for the terms, method 400 may include truncating single terms in the permutated order of terms and retrying the search.

Method 400 for generating DENs for CDM 120 may further include using quantitative linguistics and semantic analysis to refine or validate candidate ordering of terms for a complete ordered DEN. The linguistics or semantic analysis may, for example, include measuring a semantic distance between words (e.g., synonyms) using, for example, an online lexicon or thesaurus (e.g., WordNet). The linguistics or semantic analysis may, additionally or alternatively, include determining and considering polysemantic terms. Method 400 may resolve ambiguity in the meaning of the polysemantic terms, for example, by considering business or other contexts of use of the terms.

In method 400, validating the candidate ordering of terms for the complete ordered DEN for the node or equivalence class of the CDM by comparison of the ordering with reliable DEN entries in a database and/or by usage counts in search engine results 450, may involve evaluating a DEN similarity score provided by a matching or comparison algorithm. Internet or other searches also may be used to investigate public use of the candidate ordering of terms. The usage counts in search engine results (e.g., Google or Yahoo searches) may be used to confirm proper semantic use of the candidate ordering of terms in real or actual use environments or contexts and to validate the candidate ordering of terms.

Figure 5:
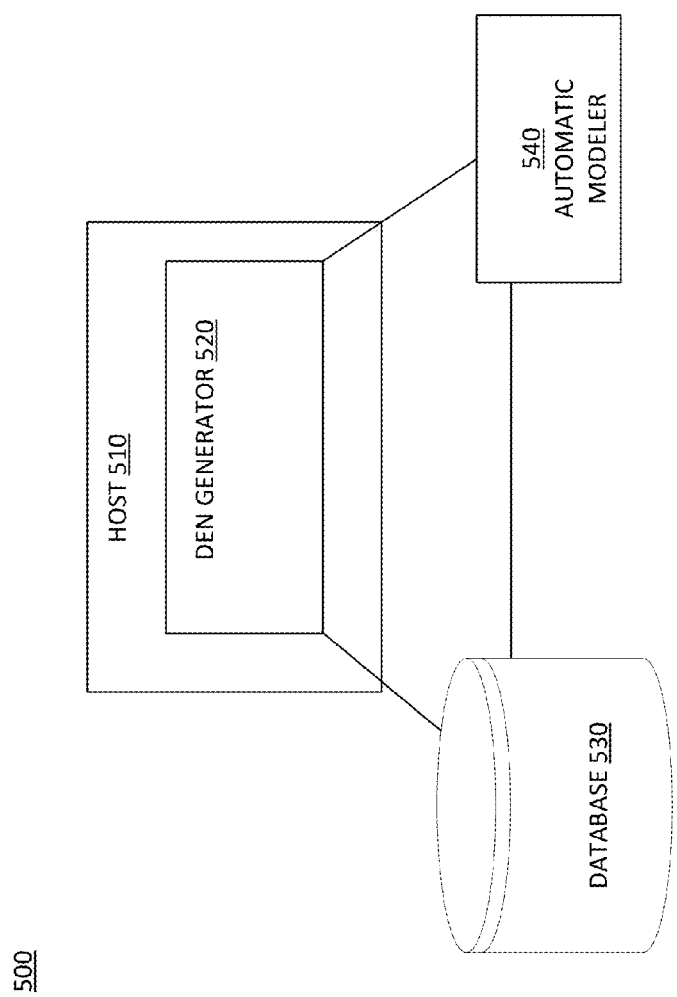
FIG. 5 is block diagram schematically illustrating a system for generating dictionary entry names for a canonical data model, in accordance with the principles of the disclosure herein.

FIG. 5 shows a block diagram of an example computer-hosted solution 500 for generating DENs for a CDM. Computer-hosted solution 500 may, for example, be used to implement method 400 for generating DENs for a CDM. Computer-hosted solution 500 may, for example, implement method 400 using a microprocessor to execute instructions or instruction sets corresponding to method 400. These instructions or instruction sets may be that are stored in a memory.

Solution 500 includes a DEN generator 520, which may be provided in non-transitory computer-readable media. The non-transitory computer-readable media may hold microprocessor-executable instructions or sets of instructions used for DEN generator 520 functions. DEN generator 520 may be hosted, for example, on a physical or virtual computer host 510, and may be coupled to a database 530 and an automatic modeler 540.

Database 530 may be a knowledge or persistence database with information on DENs. Database 530 may store a statistically significant mass of data for analysis including, for example, data on data models and their application or use in various data communication systems, template libraries of different type data systems, implementation guidelines and subsets of various type data systems, uploaded and derived mappings, and/or context specific classification of schemas and mappings. Automatic modeler 540, which may be coupled to database 530 and DEN generator 520, may be configured to analyze data in database 310 to identify or otherwise receive identified equivalence classes of data elements for building a CDM. Automatic modeler 540 may be configured to analyze the identified equivalence classes and calculate a semantic-ally likely graph for the CDM. Automatic modeler 540 may also be configured to calculate domain- or context-specific representations of the CDM. Automatic modeler 540 may further be configured to identify noise representations that may be filtered and not considered in building the CDM.

DEN generator 520 may be configured to receive information on a likely graph of nodes or equivalence classes for the CDM from automatic modeler 540 or from other sources. DEN generator 520 may be further configured generate correct CCTS-based DENs for relevant properties and artifacts of the CDM. DEN generator 520 may, for example, be configured to implement method 400 (FIG. 4) in its entirety or in part toward generating DENs. In particular, DEN generator 520 may be configured to receive input data or information on terms or names (e.g., from data base 530, automatic modeler 540 and other sources) for a DEN. DEN generator 520 may be configured to process the input data, to identify candidate terms for a DEN of a node or equivalence class in the CDM. Processing the input data by DEN generator may include quantitative linguistics and semantic analysis of the terms. The analysis may include removing uninteresting terms, resolving camel case words, part-of-speech tagging of terms, and processing nouns, verbs and adjectives toward identifying candidate terms for the DEN. DEN generator 520 may be configured to count frequencies of incidence or occurrence of candidate terms in the input data, and accordingly rank and select terms to create a candidate ordering of terms for a complete ordered DEN.

DEN generator 520 may be further configured to evaluate the candidate ordering of terms for the complete ordered DEN by comparison with known DENs (e.g., CCTS' DENs or any previous DENs) that may be stored, for example, in database 530, Internet-accessible data stores, or other databases. DEN generator 520 may be configured to refine the candidate ordering of terms by adding or removing terms, and/or permuting the terms therein. DEN generator 520 may deploy matching algorithms to obtain a DEN similarity score for a candidate ordering of terms, and use the similarity score to revise, refine, or validate the candidate ordering of terms. DEN generator 520 may be configured to identify uncertain or unknown terms and their positions for the complete ordered DEN at any stage, and to limit further analysis or processing to only resolving the uncertain or unknown terms and their positions.

DEN generator 520 may be configured to evaluate synonyms of terms in the candidate ordering of terms, for example, by accessing an online lexicon or thesaurus (e.g., WordNet). DEN generator 520 may, additionally or alternatively, be configured to determine a frequency of use of the candidate ordering of terms by considering results of searches of public data sources (e.g., Internet sources) using Internet search engines (e.g., Google, Yahoo, etc.). DEN generator 520 may, be configured to select or discard terms in the candidate ordering of terms from further consideration according to the usage search results.

DEN generator 520 may further be configured to utilize tools for quantitative linguistics and semantic analysis for evaluation of the candidate ordering of terms. The linguistics and semantic analysis may, for example, include measurement of a semantic distance between terms (e.g., synonyms), and determination and evaluation of polysemantic terms. DEN generator 520 may be configured to resolve ambiguities, for example, by consideration of the business or other context of use of the DEN or data model.

DEN generator 520 may be configured to validate the candidate ordering of terms for the complete ordered DEN of the node or equivalence class of the CDM by comparison of the ordering with reliable DEN entries in a database and/or by usage counts in search engine results. The validation may involve evaluation of a DEN similarity score provided by a matching or comparison algorithm. Internet or other searches may be used to investigate public use of the candidate ordering of terms. The usage counts in search engine results (e.g., Google or Yahoo searches) may be used by DEN generator 520 to confirm proper semantic use of the candidate ordering of terms in real or actual use environments or contexts.

The various systems, apparatus or techniques described herein may be implemented in digital electronic circuitry, or in computer hardware, firmware, software, or in combinations of them. The systems, apparatus and techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed, in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical, disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, apparatus or techniques may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data, communication, e.g., a communication network. Examples of communication networks include a local area network (LAN) and a wide area network (WAN), e.g., the internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A microprocessor-implemented method, comprising:
    receiving input data on candidate terms for building dictionary entry names (DENs) for a canonical data model (CDM);
    processing the input data to identify candidate terms for the DEN of a node or equivalence class of the CDM;
    counting a frequency of occurrence of candidate terms in the input data;
    creating a candidate ordering of terms for the complete ordered DEN of the node or equivalence class of the CDM based at least in part on the counted frequency of occurrence of candidate terms; and
    validating the candidate ordering of terms for the complete ordered DEN of the node or equivalence class of the CDM by at least one of comparison of the ordering with reliable DEN entries in a database and evaluation of relative usage counts in search engine results.

2. The method of claim 1, wherein receiving input data on candidate terms or names for building DENs for the CDM includes receiving information on equivalence classes of data elements that are used in different data structures, formats or models.

3. The method of claim 1, wherein receiving input data on candidate terms or names for building DENs for the CDM includes receiving names and natural language definitions of data elements used in different data structures, formats and models, and receiving corresponding data element names and definitions used in UN/CEFACT Core Component Technical Specification (CCTS).

4. The method of claim 1, wherein processing the input data to identify candidate terms for the DEN for the node or equivalence class of the CDM includes resolving camel case words.

5. The method of claim 1, wherein processing the input data to identify candidate terms for the DEN for the node or equivalence class of the CDM includes part-of-speech tagging of terms as nouns, verbs or adjectives.

6. The method of claim 5, wherein processing the input data to identify candidate terms for the DEN for the node or equivalence class of the CDM further includes at least one of lemmatization, consolidation of related terms, spell checking and automatic correction of spell errors, resolving abbreviations, and interpretation of compound nouns.

7. The method of claim 5, wherein processing the input data to identify candidate terms for the DEN for the node or equivalence class of the CDM further includes processing verbs and adjectives that are orthographically similar to verbs as nouns.

8. The method of claim 5, wherein processing the input data to identify candidate terms for the DEN for the node or equivalence class of the CDM further includes treating adjectives that are orthographically dissimilar to verbs as preferred DEN term qualifiers.

9. The method of claim 1, wherein counting the frequency of occurrence of candidate terms in the input data includes weighing the frequencies of occurrence of candidate terms by assigning relative weights to occurrences of candidate terms in definitions, names and DENs portions of the input data.

10. The method of claim 1, wherein creating the candidate ordering of terms for the complete ordered DEN of the node or equivalence class of the CDM includes creating an ordering of one or more terms having the highest frequencies of occurrence.

11. The method of claim 1, wherein creating the candidate ordering of terms for the complete ordered DEN of the node or equivalence class of the CDM includes inheriting a first term from a root node.

12. The method of claim 1, wherein creating the candidate ordering of terms for the complete ordered DEN of the node or equivalence class of the CDM includes determining the ordering by making permutations of the candidate terms and selecting a permuted ordering that has a highest count in a database containing reliable DEN entries.

13. The method of claim 1, wherein creating the candidate ordering of terms for the complete ordered DEN of the node or equivalence class of the CDM includes determining the ordering by making permutations of the candidate terms and selecting a permuted ordering that has a highest count in search engine results.

14. The method of claim 1, further comprising, validating the candidate ordering of terms for the complete ordered DEN of the node or equivalence class of the CDM by comparison of the ordering with reliable DEN entries in a database.

15. The method of claim 1, further comprising, validating the candidate ordering of terms for the complete ordered DEN of the node or equivalence class of the CDM by usage counts in search engine results.

16. A computer program product embodied in non-transitory computer-readable media that includes executable code, which when executed:

identifies candidate terms for a dictionary entry name (DEN) of a node or equivalence class of data elements in a canonical data model;

counts a frequency of occurrence of candidate terms in a data store; and creates a candidate ordering of terms for the complete ordered DEN of the node or equivalence class of the CDM based at least in part on the counts of frequency of occurrence; and validates the candidate ordering of terms for the complete ordered DEN of the node or equivalence class of the CDM by comparison of the ordering with reliable DEN entries in a database and/or by usage counts in search engine results.

17. The computer program product of claim 16, wherein the executable code when executed identifies candidate terms for the DEN for the node or equivalence class of the CDM by part-of-speech tagging of terms as nouns, verbs or adjectives.

18. The computer program product of claim 16, wherein the executable code when executed identifies candidate terms for the DEN for the node or equivalence class of the CDM by at least one of lemmatization, consolidation of related terms, spell checking and automatic correction of spell errors, resolving abbreviations, and interpretation of compound nouns.

19. The computer program product of claim 16, wherein the executable code when executed creates the candidate ordering of terms for the complete ordered DEN of the node or equivalence class of the CDM by creating an ordering of one or more terms having the highest frequencies of occurrence.

20. The computer program product of claim 16, wherein the executable code when executed creates the candidate ordering of terms for the complete ordered DEN of the node or equivalence class of the CDM by determining the ordering based on making permutations of the candidate terms and selecting a permutated ordering that has a highest count in a database containing reliable DEN entries.

* * * * *